(12) United States Patent
Goossen et al.

(10) Patent No.: US 7,387,451 B2
(45) Date of Patent: Jun. 17, 2008

(54) COMPOSITES FOR WIRELESS OPTICAL COMMUNICATION

(75) Inventors: Keith Goossen, Howell, NJ (US); Shridrar Yarlagadda, Newark, DE (US); Eric Wetzel, Baltimore, MD (US); Daniel O'Brien, Forest Hill, MD (US)

(73) Assignee: University of Delaware, Newark, DE (US)

( * ) Notice: Subject to any disclaimer, the term of this patent is extended or adjusted under 35 U.S.C. 154(b) by 0 days.

(21) Appl. No.: 11/546,931

(22) Filed: Oct. 12, 2006

(65) Prior Publication Data

US 2007/0098333 A1 May 3, 2007

Related U.S. Application Data

(60) Provisional application No. 60/726,116, filed on Oct. 13, 2005.

(51) Int. Cl.
*G02B 6/36* (2006.01)

(52) U.S. Cl. .......................... 385/88; 385/39
(58) Field of Classification Search ............ None
See application file for complete search history.

(56) References Cited

U.S. PATENT DOCUMENTS 4,176,910 A * 12/1979 Noethe .................. 385/114
4,537,469 A * 8/1985 Kircher .................. 385/13
6,785,447 B2 * 8/2004 Yoshimura et al. ........... 385/42
7,039,276 B2 * 5/2006 Aldridge et al. ............. 385/39
2004/0037498 A1 * 2/2004 Thiele et al. ................ 385/31

* cited by examiner

*Primary Examiner*—Rodney Bovernick
*Assistant Examiner*—Chad H Smith
(74) *Attorney, Agent, or Firm*—McCarter & English, LLP

(57) ABSTRACT

An apparatus and process for operating connectorless, free-space data porting optical structural composites with integrated optical or electrical busses are disclosed. Optical transceivers and fiber optic/coaxial cable are embedded into a foam-core composite sandwich structure which is infiltrated with vinyl ester resin. The embedded busses are composed of a signal source producing an optical free space signal, which is shone onto an optical/electrical bus containing a transceiver for converting this signal into another electrical or optical signal which then is imprinted upon a coaxial or fiber optic cable buried in the composite structure. The signal traverses the composite structure, then a transceiver converts the electrical/optical signal into a free space optical signal which shines out of the composite structure to an outside free space optical receiver. The optical free space signal is oriented to be received and transmitted at an angle of about 90 degrees relative to the composite material.

26 Claims, 15 Drawing Sheets

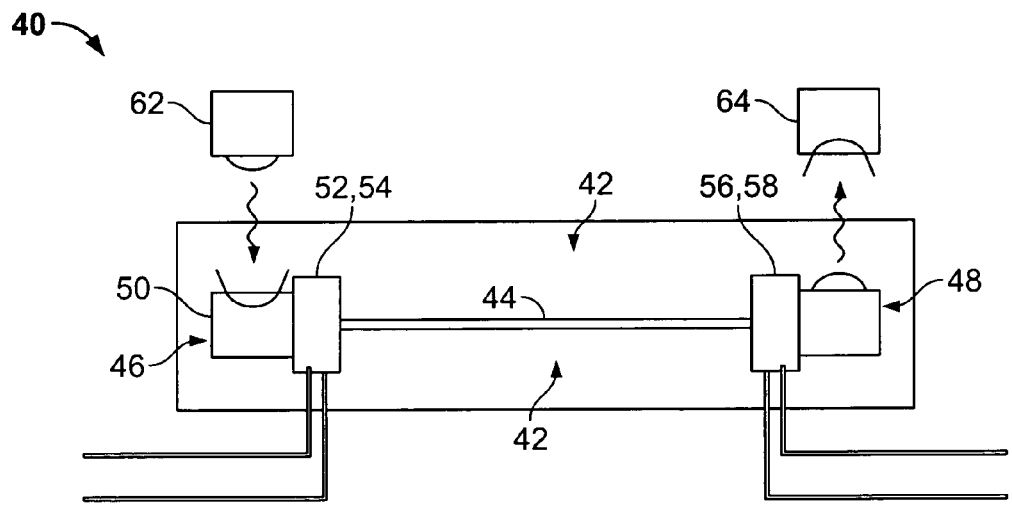
FIG. 3
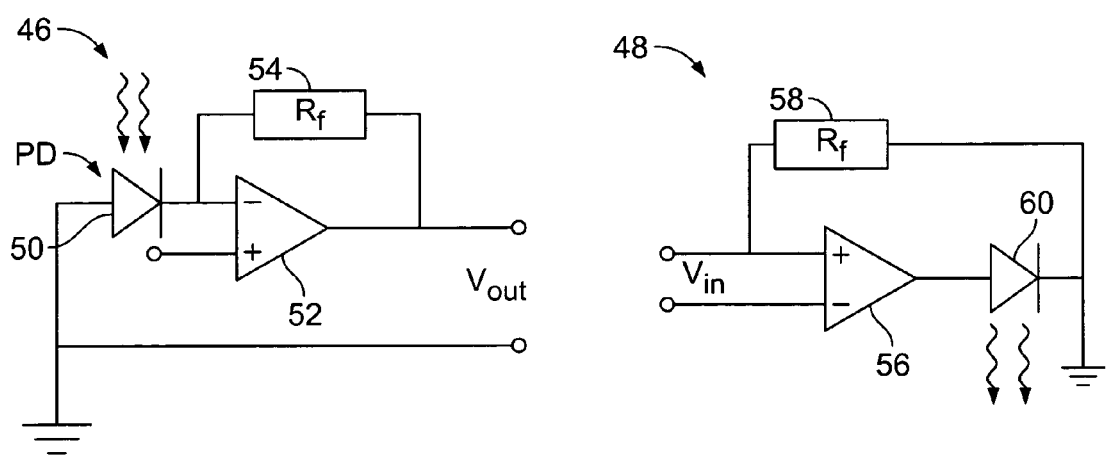
FIG. 4A
FIG. 4B

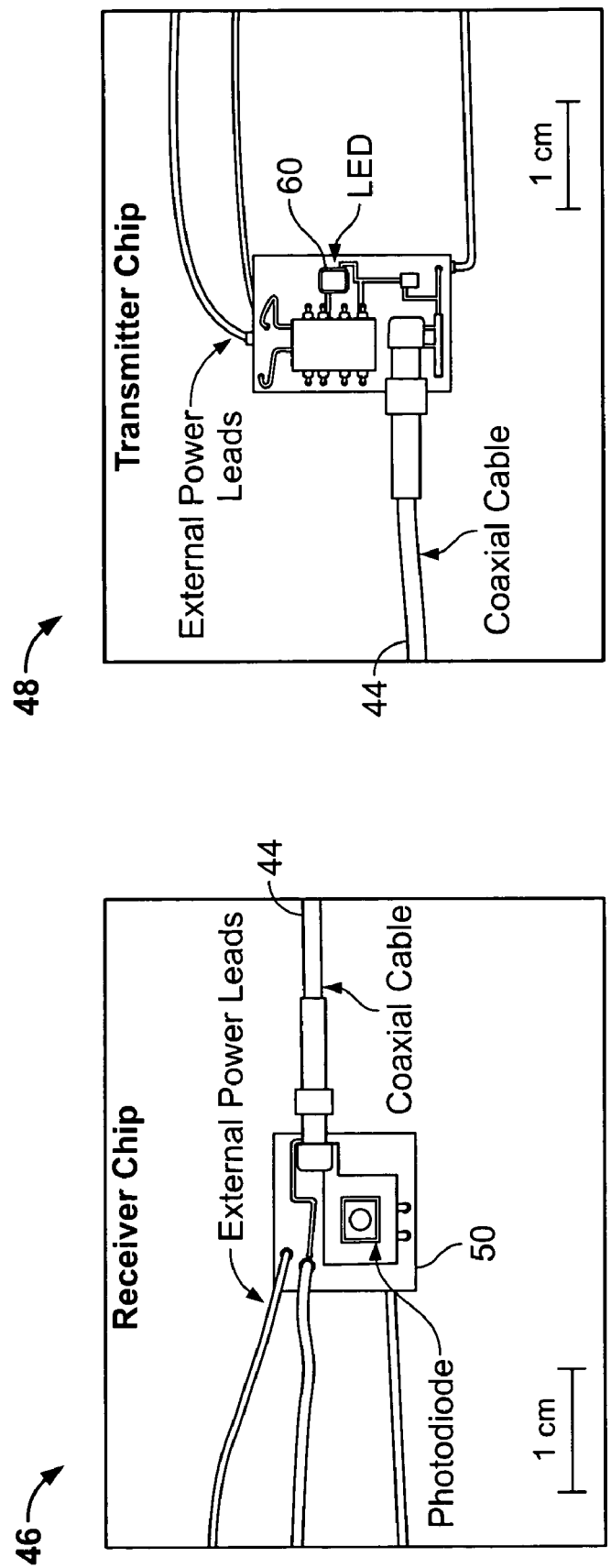

COMPOSITES FOR WIRELESS OPTICAL COMMUNICATION

CROSS-REFERENCE TO RELATED APPLICATIONS

This application claims the benefit of U.S. provisional patent application No. 60/726,116 filed Oct. 13, 2005, the disclosure of which is incorporated herein by reference in its entirety.

STATEMENT OF GOVERNMENT INTERESTS

The present was sponsored by the Army Research Laboratory under Contract Number DAAD19-01-02-0001. Accordingly, the government has certain interests in the present invention.

FIELD OF THE INVENTION

The present invention relates to communications networks and, more particularly, to connectorless, normal incidence, free-space data porting optical structural composites with integrated optical or electrical busses.

BACKGROUND OF THE INVENTION

Considerable work has been performed on embedding electrical cabling and optical fibers into structural composite materials. Typically, this embedded cabling is integrated with sensor arrays in order to measure and report environmental and material conditions such as temperature, strain, and onset of damage. Another application for embedded cabling is for creating an integrated optical bus for high bandwidth data communication throughout a composite structure. Such an integrated bus can be used to transmit information between external or embedded sensors, actuators, processors, displays, communication devices, and other components associated with the composite structure. In such circumstances, the composite structure acts as a structural local area network (LAN).

One example application for a structural LAN is in a modern military ground vehicle, which has a series of complex, interdependent subsystems such as propulsion, communication, and weapons. Currently, conductive wiring is traced between components in the vehicle. This technique has several disadvantages. Cutouts in the structure are necessary to provide a pathway for wiring between onboard devices. Electrical cabling, especially for complex systems with many components, can introduce significant weight and volume. Wireless communication is one alternative to electrical wiring, but is susceptible to interference, jamming, and interception.

Replacing the external cabling in the military vehicle with integrated busses embedded in a composite structure offers a number of advantages over wired or wireless LANs, such as lower weight and volume, higher bandwidth, and insusceptibility to interference, jamming, and interception. However, an important challenge is the connectorization of the embedded cabling to external devices. Interfacing with embedded busses using conventional techniques requires physical connectorization. For electrical busses, coaxial or multi-pin interfaces are most common. For optical busses, ferrules and mechanically interlocking connectors are typically implemented. For example, to implement this approach for embedded optical fibers, a short length of fiber end is typically traced out of the structure. These "pigtails" are extremely fragile and bulky, and have greatly limited the practical application of embedded optical fibers.

One method for remote querying of embedded components in a military vehicle is via RF communications. However, in applications where interference, jamming, or interception of signals is possible, methods using RF communication are unfavorable. Another method used for remote querying of embedded components is to use a graded index lens (GRIN). This approach typically requires the interrogation light source to have line-of-sight access to the end face of the optical fiber, which limits interrogation to the edges of composite structures. For most practical structural network applications, however, edge access is very limited.

What would be desirable, but has heretofore not been implemented, are noninvasive, normal incidence, free-space data porting structural composites with integrated optical busses.

SUMMARY OF THE INVENTION

The present invention overcomes the disadvantages and shortcomings of the prior art discussed above by providing an optical composite structure which includes a composite material. The composite structure includes a first optical transceiver for receiving an optical signal external to the composite material, which is embedded in the composite material at a first location and oriented to receive the external optical signal at an angle to the composite material. The composite structure also includes a second optical transceiver for transmitting a second optical signal external to the composite material, which is embedded in the composite material at a second location and oriented to transmit the second optical signal at an angle to the composite material. The composite structure also includes a communication medium embedded in the composite material for allowing communication between the first optical transceiver and the second optical transceiver. A fiber optic cable acting as an optical bus or a coaxial cable acting as an electrical bus may be embedded in the composite material and functions as the communication medium. The optical free space signal is oriented to be received and transmitted at an angle of about 90 degrees relative to the composite material.

In the present invention, optical transceivers are designed, fabricated, and embedded into composite materials so that data can be ported into and out of the embedded optical/electrical busses using line-of-sight optical devices. The transceivers and fiber optic/coaxial cable are embedded into a foam-core composite sandwich structure. The embedded busses of the invention include a signal source producing an optical free space signal, which is aimed at an optical/electrical bus containing a transceiver for converting this signal into another electrical or optical signal which then is transmitted using a coaxial or fiber optic cable buried in the composite structure. The signal traverses the composite structure, and a second transceiver converts the electrical/optical signal into a free space optical signal which is transmitted out of the composite structure to an external, free space optical receiver. These embedded transceivers can be remotely sensed by external optical transceivers, so that signal coupling to the composite structure can be achieved without physical connectorization.

In a passive embodiment of the present invention, the embedded link includes a composite encasing a plastic fiber optic cable and a pair of mirrors.

In an active embodiment of the present invention, an externally powered, active transceiver utilizes semiconductor components. A composite material encases a glass fiber optic cable, an input photodetector, an externally powered optical-to-electrical converter integrated circuit, an input driving LED, an output photodetector, an electrical-to-optical converter integrated circuit, and an output driver LED.

In another active embodiment of the present invention, an embedded link includes externally powered, semiconductor-based active transceivers electrically coupled to microcoaxial cable link with the transceivers embedded in the resin of a composite structure. The receiver can include an operational amplifier with a negative feedback photodiode. The transmitter can also include an operational amplifier with a negative feedback light-emitting diode (LED).

In another active embodiment of the present invention, an embedded link includes semiconductor-based active transceivers which draw their power from an outside optical transmitter, a glass fiber optical cable, and an encasing composite. The receiver includes a series connection of a plurality of photodiodes. The photodiodes are used to drive an 850 nm vertical-cavity surface-emitting laser (VCSEL) via the fiber optical cable.

Another self-powered active embodiment of the present invention uses embedded optical fibers with impregnated fluorescent dye. The dye fibers convert an external visible (light-emitting diode) signal into waveguided light which is transmitted into the fiber. The dye-based impregnated optical fiber is directly stimulated by incoming optical signals. New photons, generated by the dye, travel along the optical fiber and are directed out of the embedded structure through passive optics (e.g., a mirror).

Further features and advantages of the invention will appear more clearly on a reading of the following detailed description of several exemplary embodiments of the invention, which are being provided by way of example only with reference to the accompanying drawings.

BRIEF DESCRIPTION OF THE DRAWINGS

For a more complete understanding of the present invention, reference is made to the following detailed description of several exemplary embodiments considered in conjunction with the accompanying drawings, in which:

FIG. 3 is a block diagram showing a free-space optical porting composite structure of the present invention which employs a externally powered, semiconductor-based active transceivers with an electrical bus;

FIG. 4A is a circuit diagram showing the electrical components of externally powered receiver device employed in FIG. 3;

FIG. 4B is a circuit diagram showing the electrical components of externally powered transmitter device employed in FIG. 3;

FIG. 5A is a perspective view of the electrical components of externally powered receiver device employed in FIG. 3;

FIG. 5B is a perspective view of the electrical components of externally powered transmitter device employed in FIG. 3;

DETAILED DESCRIPTION OF THE INVENTION

The present invention relates to connectorless busses embedded in a composite structure to allow for using free-space optical porting of signals through the structure. The composite structures of the present invention be classified as passive or active. In a passive embodiment of the present invention, photons transmitted into an optical bus are directly shuttled along the bus and out of the structure to an external device. The key is that the same photons that are going into the composite are also leaving the composite. In active embodiments of the present invention, the photons transmitted to the composite are converted to either an electrical signal or to new photons that are then shuttled down the bus and out of the composite to an external device. Photodiodes and LED's can be used to convert incoming photons to an electrical signal or a new optical signal, or the bus itself can be the active component. Active embodiments of the present invention can further be classified as externally powered or self-powered. Externally powered configurations would require batteries or a power supply whereas self-powered configurations could be powered by the incoming optical signal itself. In all embodiments, an optical free space signal is oriented to be received and transmitted at an angle of about 90 degrees relative to the composite material.

Figure 1:
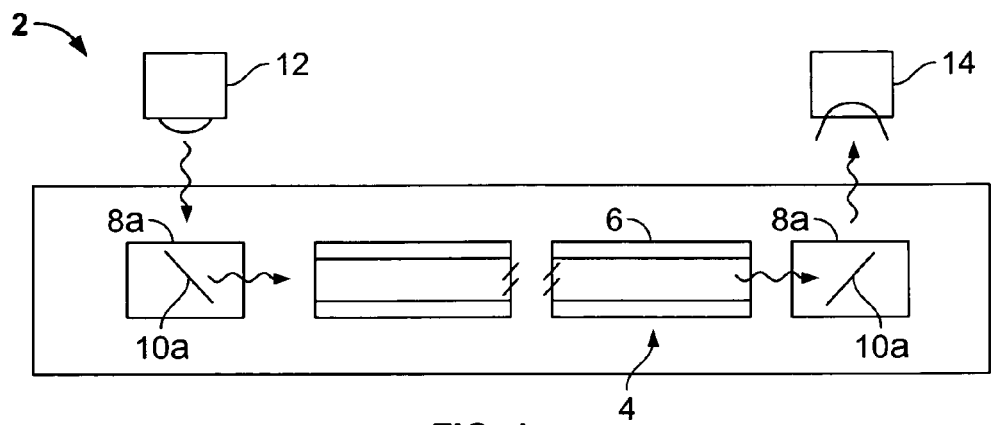
FIG. 1 is a block diagram showing a free-space optical porting composite structure of the present invention which employs passive transceivers.

With reference to FIG. 1, a composite structure of the present invention, generally indicated at 2, employs a passive free-space optical porting technique which includes a composite 4 encasing a plastic fiber optic cable 6 and passive transceivers 8a, 8b. The passive transceivers 8a, 8b are implemented by a pair of mirrors 10a, 10b. The mirrors 10a, 10b are used to port incoming photons from, for example, a light emitting diode (LED) 12 into the plastic fiber optic cable 6, and thenceforth to direct the same photons out of the plastic fiber optic cable 6 to an external optical detector 14 (e.g. a photodetector). This approach is simple and requires no external power but requires careful optical design to allow for efficient coupling of photons between components.

Figure 2:
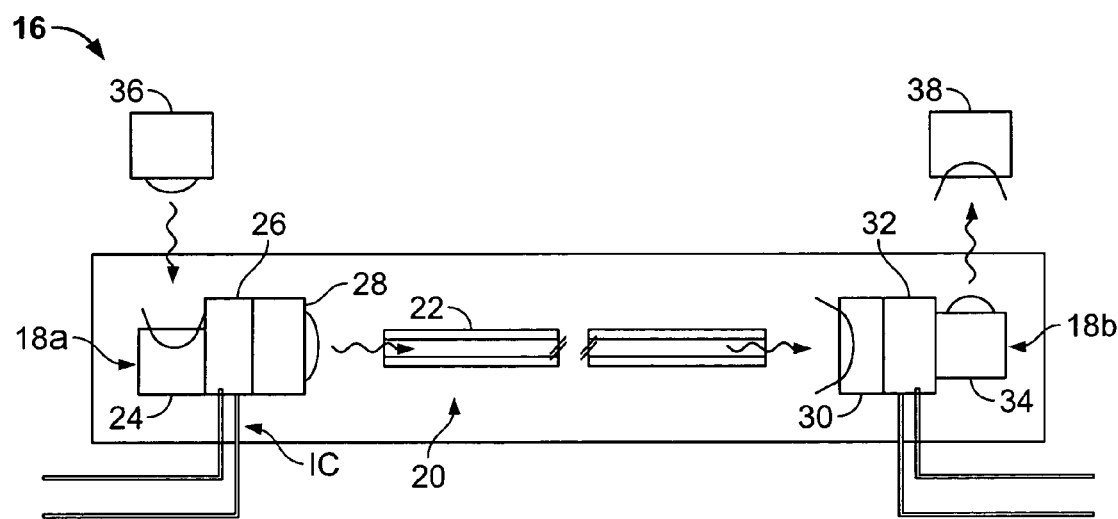
FIG. 2 is a block diagram showing a free-space optical porting composite structure of the present invention which employs externally powered, semiconductor-based active transceivers.

FIG. 2 depicts an composite structure 16 employing an active free-space optical porting technique which uses an externally powered, active transceivers 18a, 18b. The transceivers 18a, 18b include semiconductor components, such as a composite 20 encases a glass fiber optic cable 22, an input photodetector 24, an externally powered optical-to-electrical converter integrated circuit 26, an input driving LED 28, an output photodetector 30, an electrical-to-optical converter integrated circuit 32, and an output driver LED 34. The optical-to-electrical converter integrated circuit 26 and the electrical-to-optical converter integrated circuit 32 can include semiconductor devices such as photodiodes, LEDs, and integrated circuits. For example, optical-to-electrical converter integrated circuit 26 can include a United Detector Technologies UDT-451 photodiode-amplifier hybrid circuit, while the electrical-to-optical converter integrated circuit 32 can include an Analog Devices AD711JN amplifier. Incoming photons from a source LED 36 are detected and converted into an electrical signal by the input photodetector 24 and the converter integrated circuit 26, which drives the LED 28. The LED 28 is directly coupled to the optical fiber 22. A similar conversion is used to transmit the optical signal out of the composite structure 16. The output photodetector 30 receives photons from the optical fiber 22, which is converted by the electrical-to-optical converter integrated circuit 32 to an optical signal transmitted by the LED 36 and is received by an external photodetector 38. This approach does not require sophisticated optics or alignment.

Now referring to FIGS. 3, 4A-4B, and 5A-5B, there is shown a composite structure 40 of the present invention which uses externally powered, semiconductor-based active transceivers 46, 48 (i.e., a receiver and transmitter) with an electrical bus 44 to achieve a connectorless communication link. Unlike the composite structure 16 depicted in FIG. 2, the composite structure 40 uses an electrical bus 44 rather than an optical bus. The composite structure 40 includes an encasing composite 42, a coaxial cable electrical bus 44, a transceiver 46 (receiver), and a transceiver 48 (transmitter).

The electrical bus 44 is shown herein as a coaxial cable, but any electrical bus 44 capable of transmitting and receiving in the multi-megabit to gigabit range is suitable, including, but not limited to twisted pair copper conductors, etc. As shown in FIG. 4A, the transceiver 46 includes a photodetector 50, and an operational amplifier 52 with a negative feedback resistor 54. As shown in FIG. 4B, the transceiver 48 includes an operational amplifier 56 with a negative feedback resistor 58 and feedback LED 60. The transceiver 46 can be implemented, for example, with a United Detector Technologies UDT-451 detector/preamplifier chip. The transceiver 48 can be implemented, for example, with an Analog Devices Inc. AD711JN op-amp which can be used to power for example a Ledtronics Inc. 850 nm surface mount LED. The transceiver 46 can be connected to the transceiver 48 through, for example, a RG178B/U micro-coaxial cable 44 (1.91 mm diameter) (obtained from Pasternack Enterprises Inc.). A free space signal is injected into the composite structure 40, for example, by an external LED 62 shown in FIG. 3, and converted to an electrical signal at the transceiver 46. The electrical signal is then transmitted through the coaxial cable 44 and is amplified at the transceiver 48, thus converting the electrical signal back to a free space optical signal, which can be detected, for example, by an external photodetector 64.

Figure 6:
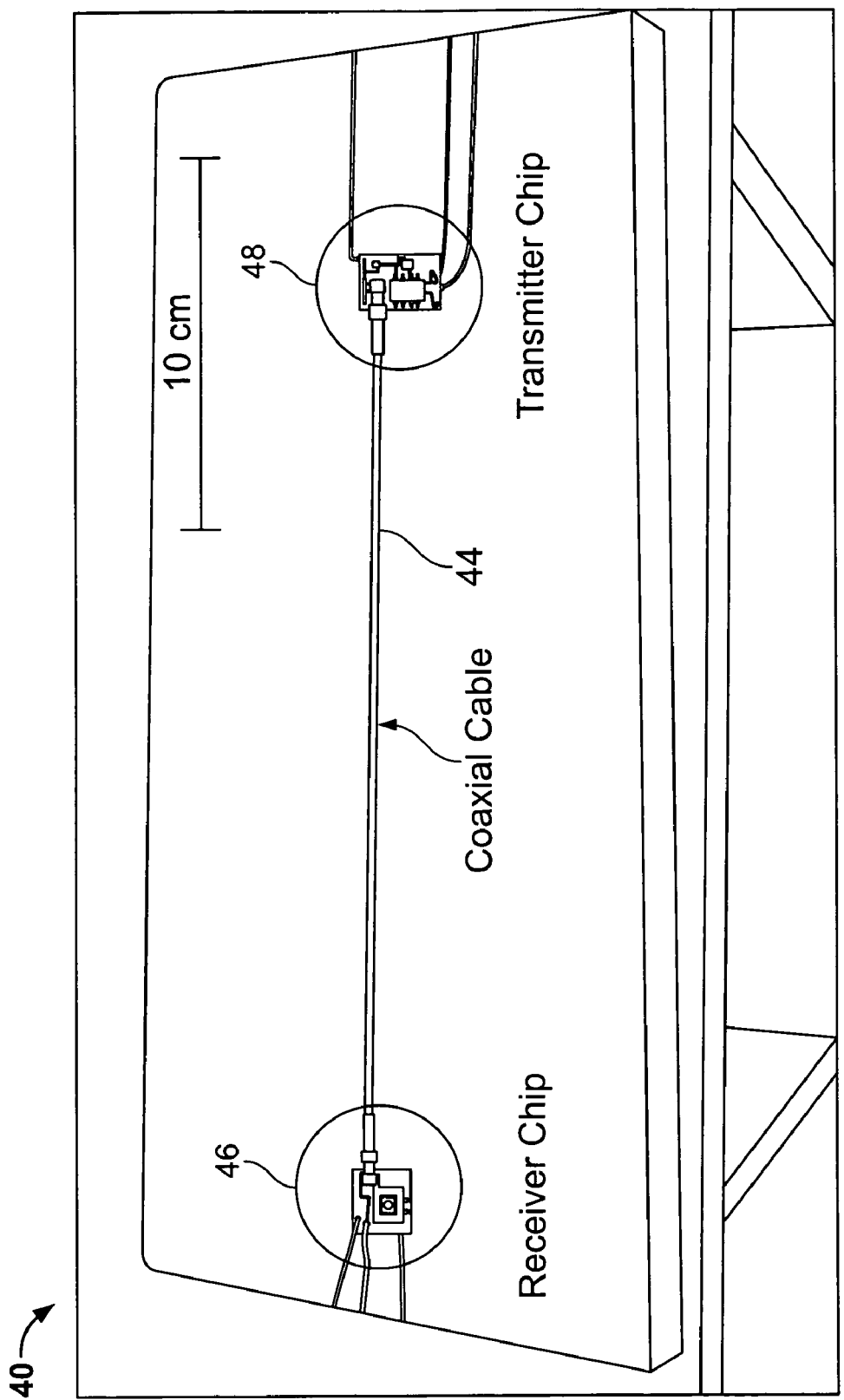
FIG. 6 is a perspective view of the components of FIG. 3 embedded in the composite structure.
Figure 7:
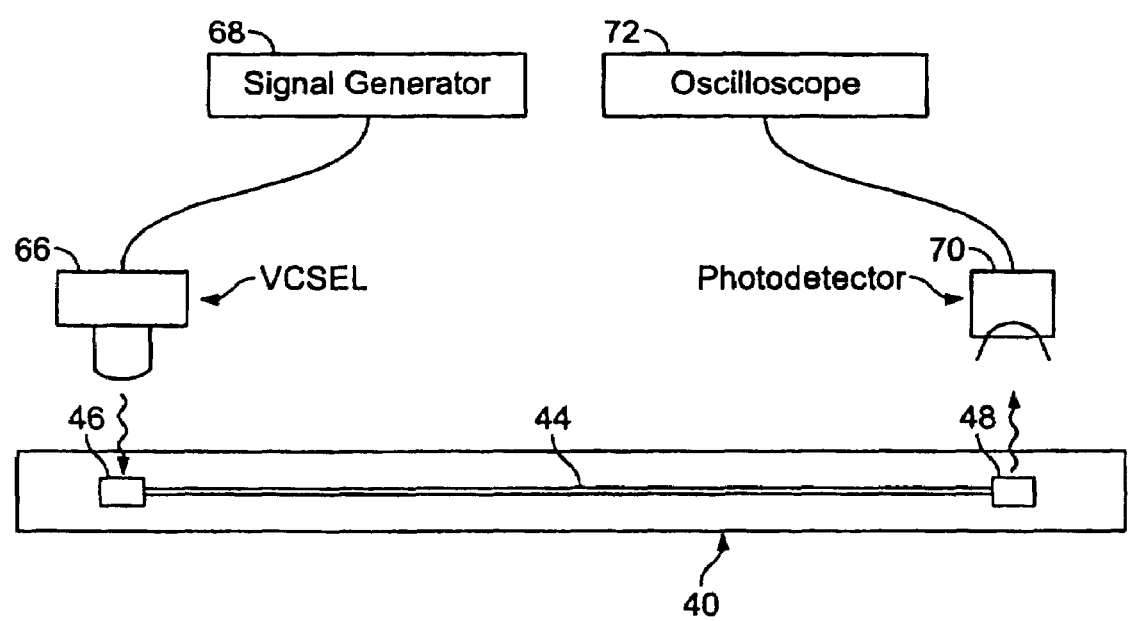
FIG. 7 is a block diagram showing the composite structure of FIGS. 3 and 6 in an environmental and mechanical testing setup.

FIGS. 6 and 7 show one embodiment wherein the transceivers 46, 48, and coaxial cable 44 are integrated into a foam-core composite sandwich structure 40. The composite structure 40 was formed using a foam core impregnated with resin. In the embodiment shown in FIG. 6, recesses were cut into a 38 cm×16 cm×1.3 cm Divinycell® H-grade closed cell foam core to accept the transceivers 46, 48. Three layers of Vetrotex E-glass plain weave fabric were infiltrated with Derakane® VE510A-40 vinyl ester resin using a vacuum assisted resin transfer molding (VARTM) technique and cured at 25° C. for 16 hours. 6 mm diameter holes were cut into one of the skins, to provide sight paths to the embedded active optical devices. Vinyl ester resin was then manually brushed onto the foam core faces and one face of each of the skins, which were then stacked into the composite sandwich structure 40. The composite sandwich structure 40 was placed under 40 kg of weights and allowed to cure at room temperature for 16 hours.

The embodiment shown in FIGS. 6 and 7 was tested by placing it into an environmental and mechanical testing apparatus. After fabrication, the power leads of the composite structure 40 were connected, for example, to a 20 V DC dual power supply. The composite structure 40 was tested by modulating an ULM Photonics ULM850-04-TN-ULCBPP 850 nm Vertical Cavity Surface Emitting Laser (VCSEL) 66 driven by an HP 8082A pulse generator 68. The output signal was detected by using a United Detector Technologies UDT PIN-10DP-0327-1 photodetector 70 which was connected to an Agilent Infinium® oscilloscope 72 so that the signal could be measured. The composite structure 40 was shown to be operational at 10 kHz. A link efficiency of approximately 1% free space to free space light was measured. Therefore, given an input power of 1 mW an output power of 10 μW can be obtained which is sufficient for optical communication.

Figure 8:
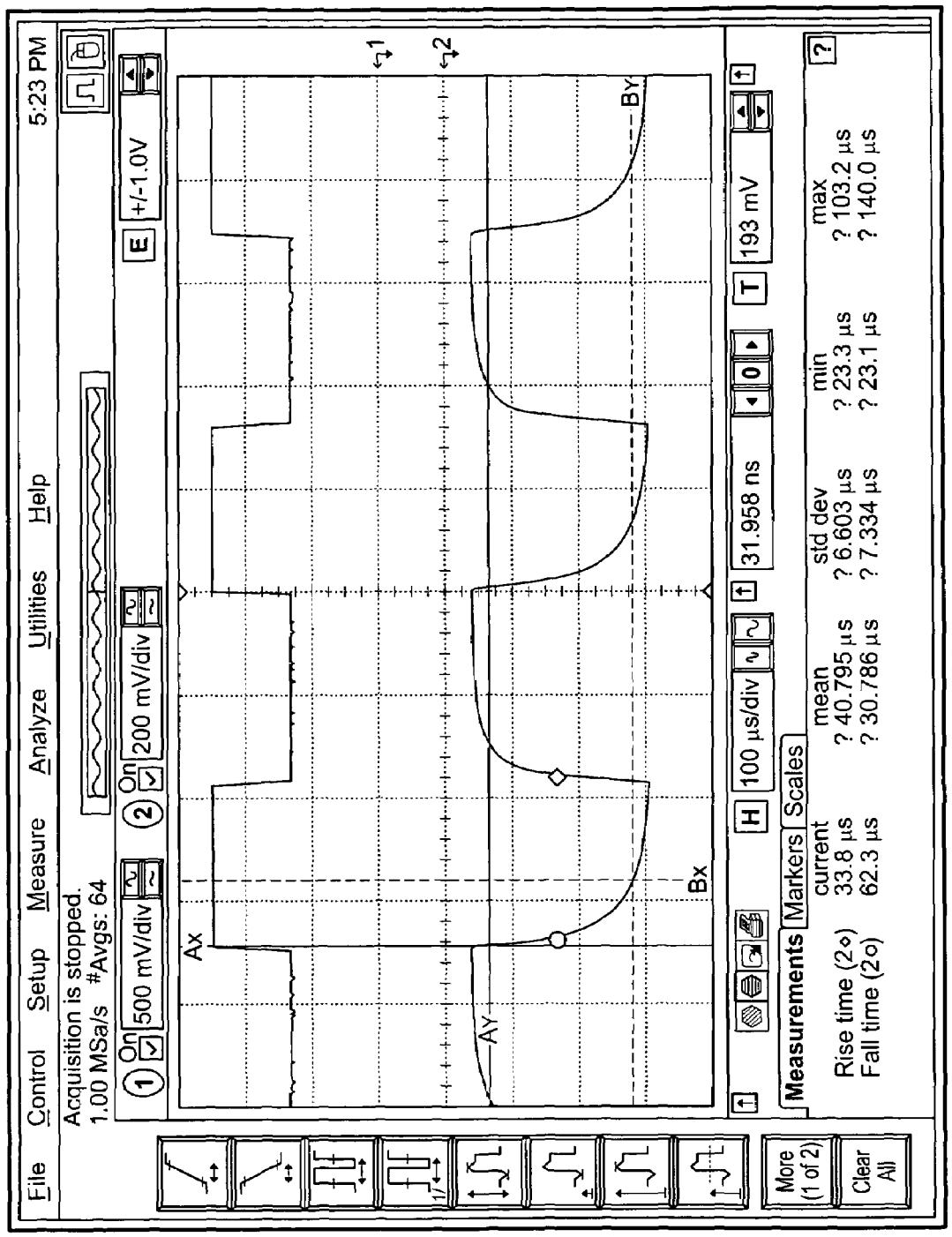
FIG. 8 is an oscilloscope trace showing an input square wave signal and the resulting output signal generated by the composite structure of the present invention which employs a externally powered, semiconductor-based active transceivers with an electrical bus.
Figure 9:
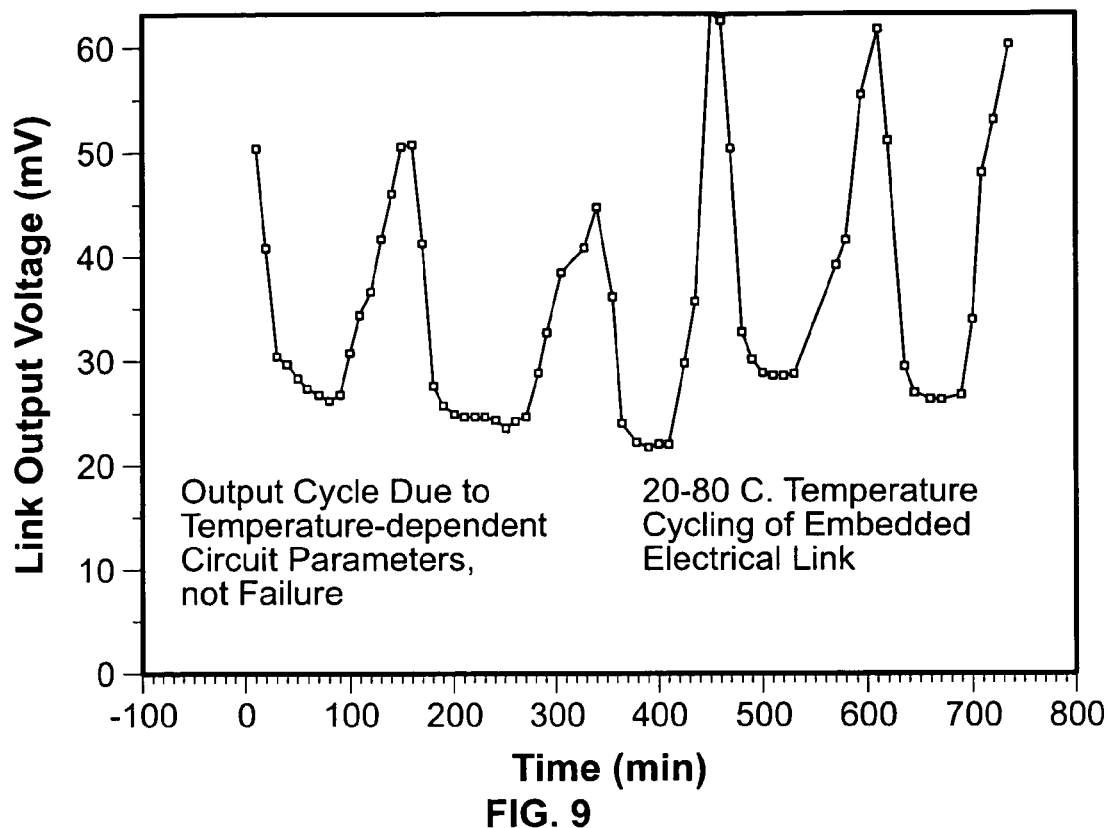
FIG. 9 is a plot of link output voltage versus time, illustrating temperature cycling results for the composite structure of FIG. 7.

FIG. 8 is an oscilloscope trace showing data transmission through the composite structure of FIGS. 6 and 7. The upper trace 1 is the input signal, while the lower trace 2 is the output signal. The output signal on trace 2 is scaled to approximately match the size of the input waveform with only some exponential rounding of the square wave edges and the output waveform is inverted relative to the input waveform for convenience of display (a non-inverting output waveform could also have been displayed). To determine if the composite structure 40 was capable of operating under realistic environmental conditions, a series of reliability experiments were performed. Using a Shel Lab 133OGM convection oven, the composite structure 40 was subjected to five 150 minute cycles between 20° C. and 80° C. The data from this test can be seen in FIG. 9. The change in output voltage was due to the temperature dependence of the circuit elements, not due to failure of the composite structure 40. Minor variations in the output voltage were also caused by changes in optical coupling to the composite structure 40, caused by shifting in the positioning of the external devices. This effect can be seen in the last two cycles which have output voltages of approximately 60 mV at 20° C. as compared to the first three cycles which had output voltages of approximately 50 mV at 20° C. After temperature cycling, an 85/85 heat and humidity soak (85° C./85% humidity) was performed for over 500 hrs. The composite structure 40 was fully operational after the soak was completed.

Figure 10:
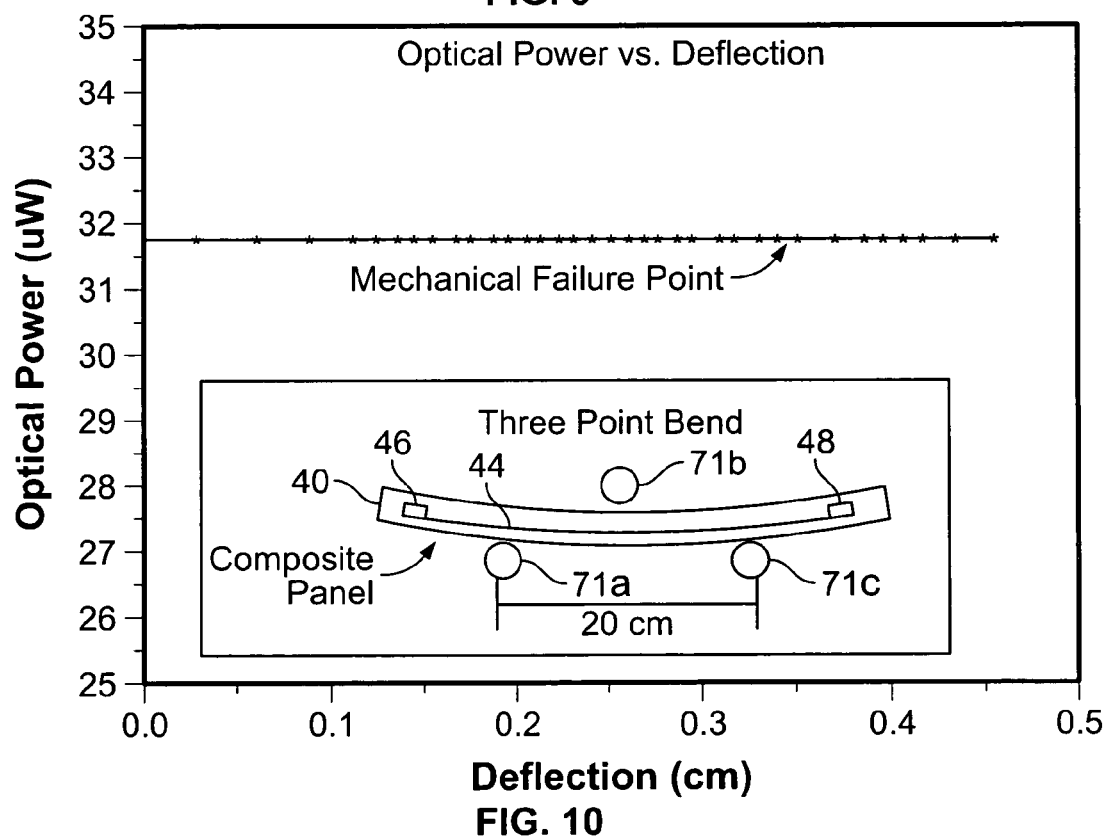
FIG. 10 is a plot of optical power versus deflection, illustrating mechanical testing results for the composite structure of FIG. 3, and including an inset block diagram of a three-point bend setup.

A mechanical test was performed to see how the composite structure 40 would operate as the composite was loaded through mechanical failure. A three-point bend test using a load span 71a-71c was performed as shown schematically in FIG. 10. The composite structure 40 was operated under a continuous optical signal during testing. Mechanical crimping of the composite structure 40 occurred at a deflection of 0.35 cm but the operation of the composite structure 40 was unaffected. The composite structure 40 was subjected to further deflection up to 2.54 cm, and the composite structure 40 remained completely operational. Upon releasing the load, a decrease in the optical power from 31.8 uW to 31.2 uW was observed. This decrease corresponded to less than a 2% loss of optical power, which can be considered negligible. Note that the transceiver devices 46, 48 are located outside of the load span 71a-71c. The coaxial cable 44 is located approximately 2 mm below the surface of the skin, above the core midplane, and is therefore loaded in compression during the testing. It is also important to note that the composite structure used for mechanical testing was the same composite structure 40 that was previously exposed to the thermal cycling and heat/humidity soak.

Figure 11:
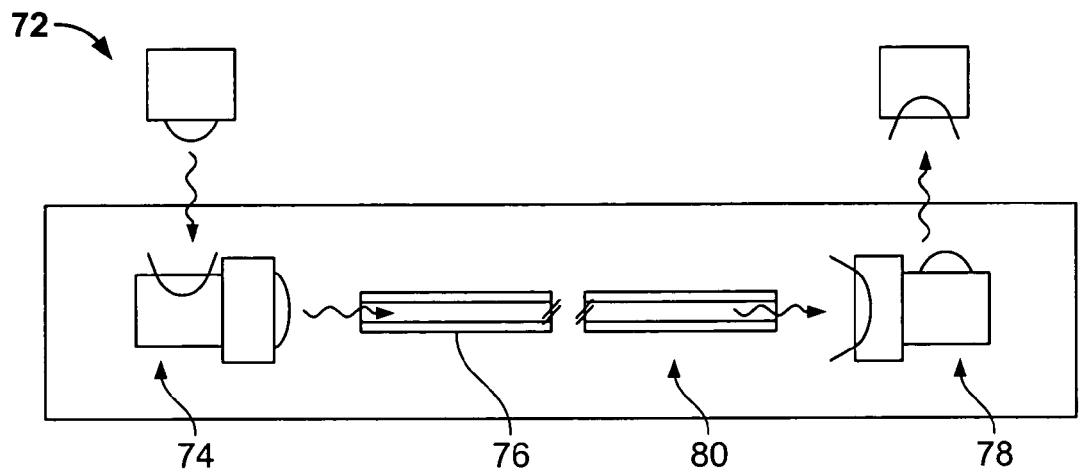
FIG. 11 is a block diagram showing a free-space optical porting composite structure of the present invention which employs self-powered, semi-conductor based active transceivers using an optical bus.
Figure 12:
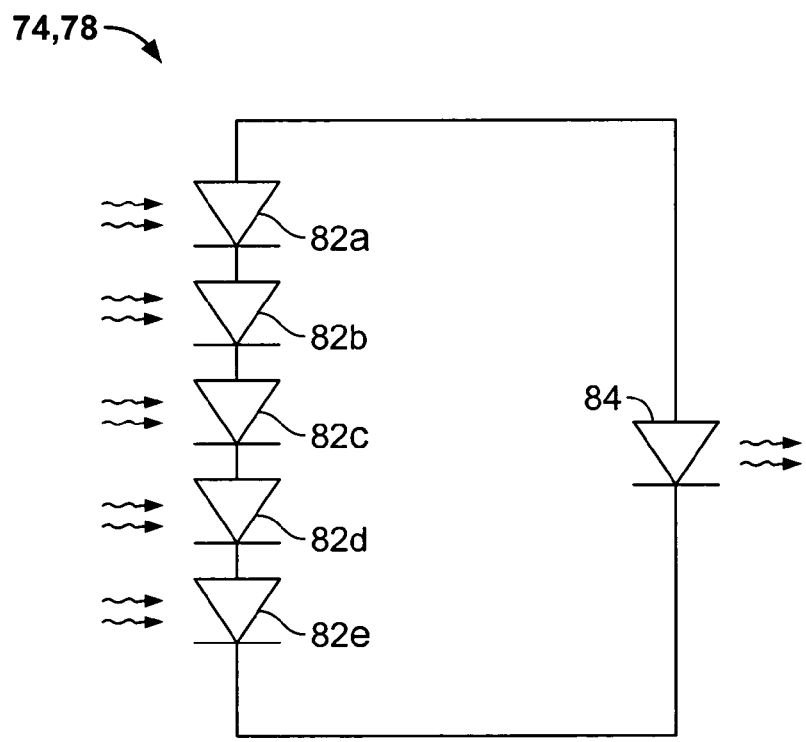
FIG. 12 is a circuit diagram showing one of the self-powered active receiver and transmitter of FIG. 11 in greater detail.
Figure 13:
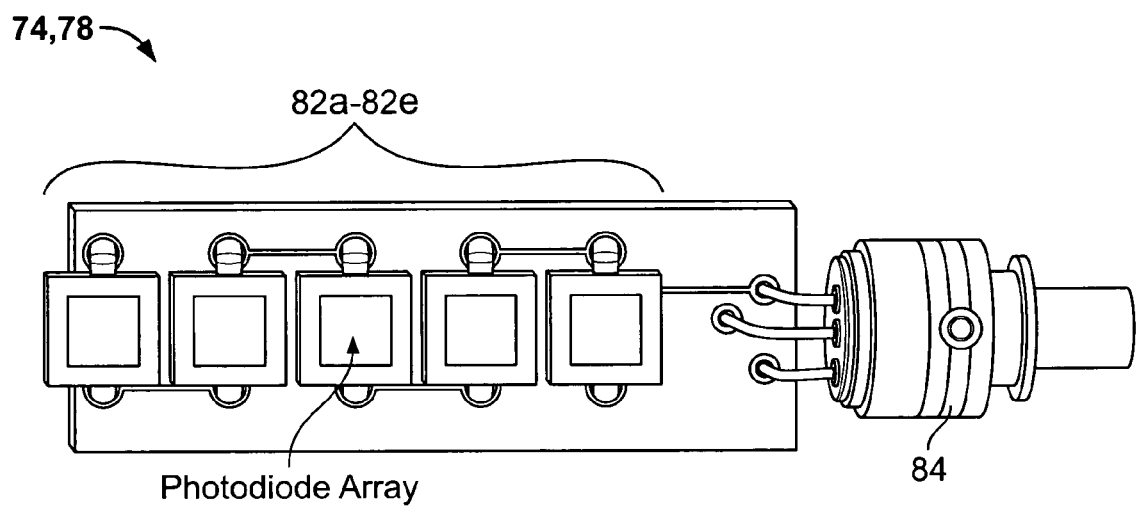
FIG. 13 is a perspective view of the electrical components of the self-powered active receiver and transmitter device shown in FIG. 11.

Now referring to FIGS. 11-13, in another embodiment of the present invention, a composite structure 72 uses a self-powered, active transceiver utilizing semiconductor components with an optical bus to achieve a connectorless embedded link. The composite structure 72 includes a transceiver 74 (receiver), a glass fiber optical cable 76, a transceiver 78 (transmitter), and an encasing composite 80. As shown in FIGS. 12 and 13, the transceiver 74 includes a series connection of a plurality of photodiodes 82a-82e (e.g., five Vishay Semiconductor BPW34 silicon PIN photodiodes). The photodiodes 82a-82e are used to drive a ULM Photonics ULM850-04-TN-ULCBPP 850 nm vertical-cavity surface-emitting laser (VCSEL) 84 via the fiber optical cable 76. The multiple photodiodes 82a-82e are used in order to generate sufficient voltage to drive the VCSEL 84. A laser-based light source (i.e., the VCSEL 84), instead of an LED, is used for the output signal due to its increased efficiency once the laser reaches its threshold current. The VCSEL 84, in particular, has a very low threshold current compared to conventional edge emitting lasers. However, in other embodiments, any light emitting device such as an LED or an edge emitter may be substituted. The construction of the transceiver 78 is similar to the construction of the transceiver 74.

Figure 14:
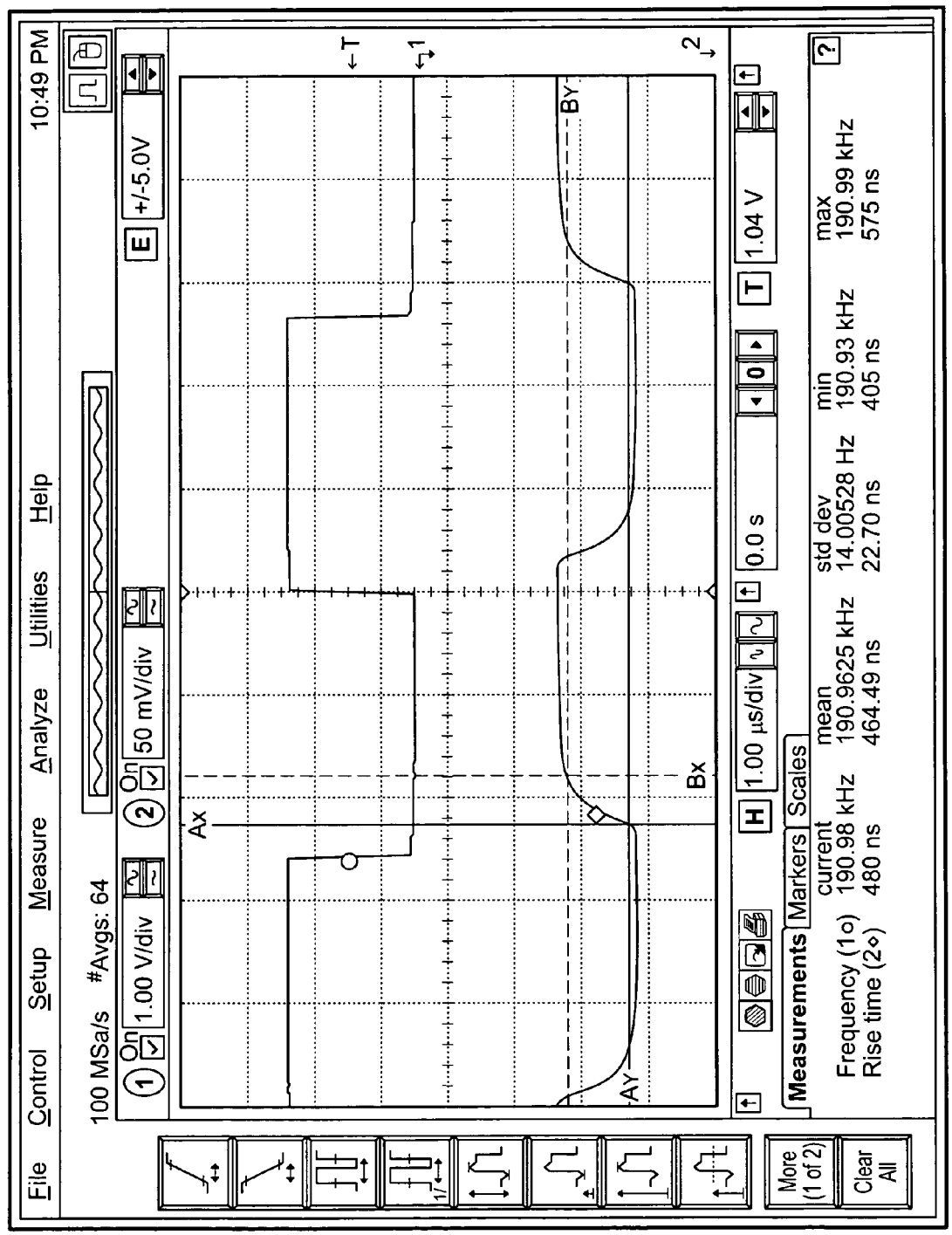
FIG. 14 is an oscilloscope trace showing an input square wave signal and the resulting output signal generated by the composite structure of the present invention which employs self-powered, semi-conductor based active transceivers using an optical bus.

FIG. 14 is an oscilloscope trace showing data transmission through the composite structure 72 of FIGS. 11-13. The upper trace 1 is the input signal, while the lower trace 2 is the output signal. The output signal on trace 2 shows an attenuation factor of 100 with only some exponential rounding of the square wave edges and the output waveform is inverted relative to the input waveform for convenience of display (a non-inverting output waveform could also have been displayed). Note that the measurements indicated in the oscilloscope trace indicate data transmission rates of greater than 1 MHz.

Figure 15:
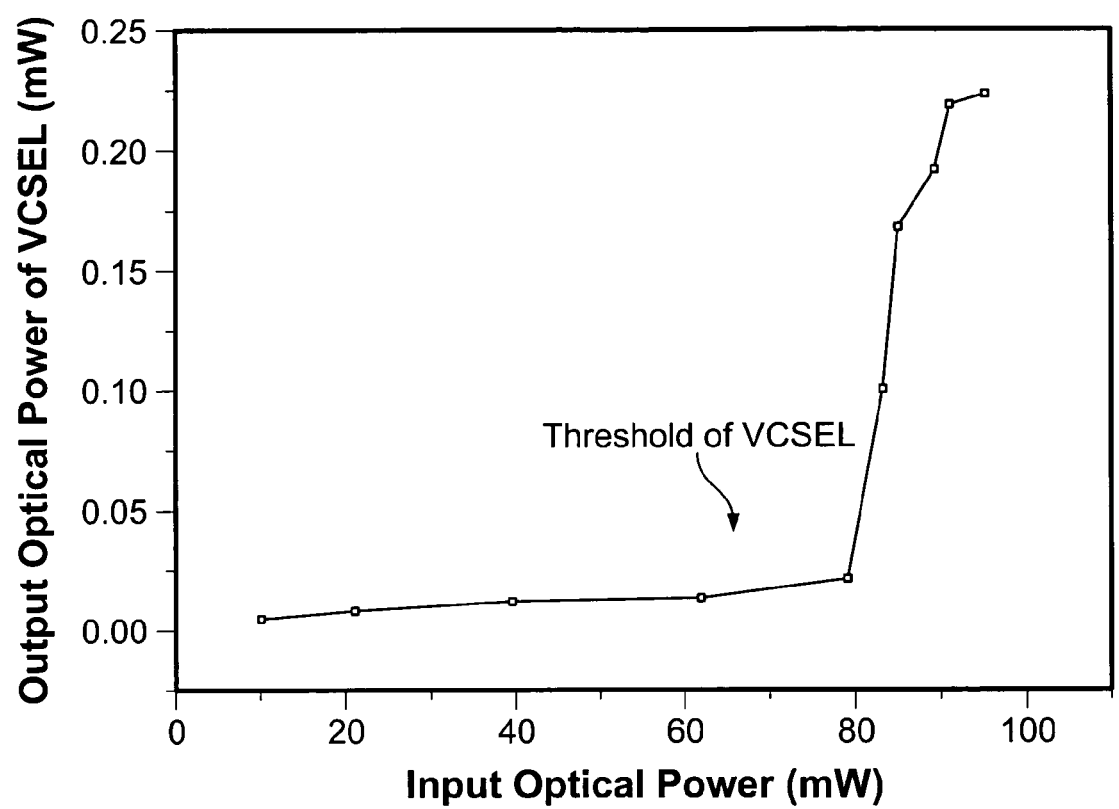
FIG. 15 is an efficiency plot for the photodiode-based receiver device employed in FIG. 11.

Referring now to FIG. 11-15, DC optical measurements on the composite structure 72 of FIGS. 11-13 were performed by driving the photodiodes 82a-82e with a Mille Luce M1000 light source connected to a fiberscope and connectorizing the VCSEL 84 directly to a Promax Prolite-20 fiber optic test meter. As shown in FIG. 15, the composite structure 72 demonstrated a 2.5% efficiency after the VCSEL 84 reaches its threshold current. Note that before the VCSEL 84 reaches its threshold current, the efficiency is only 0.025% and then increases dramatically by a factor of 100 after the threshold.

Figure 16A:
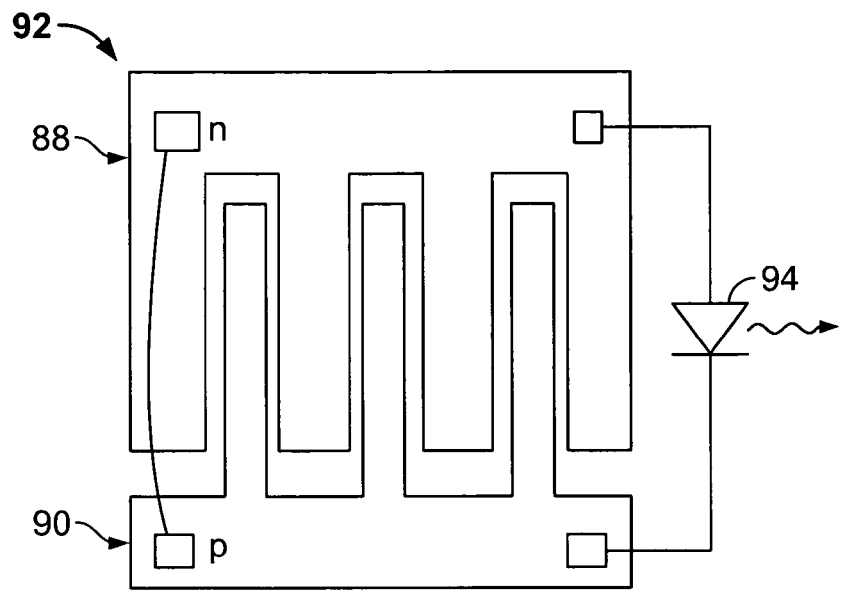
FIG. 16A is a block diagram of an alternate implementation of the device shown in FIG. 11, employing interdigitated dual photodiode transceivers.
Figure 16B:
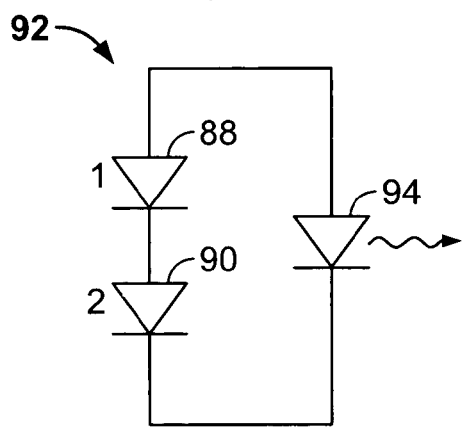
FIG. 16B is a circuit diagram showing the electrical components employed in the interdigitated dual photodiode transceivers of FIG. 16A.
Figure 16C:
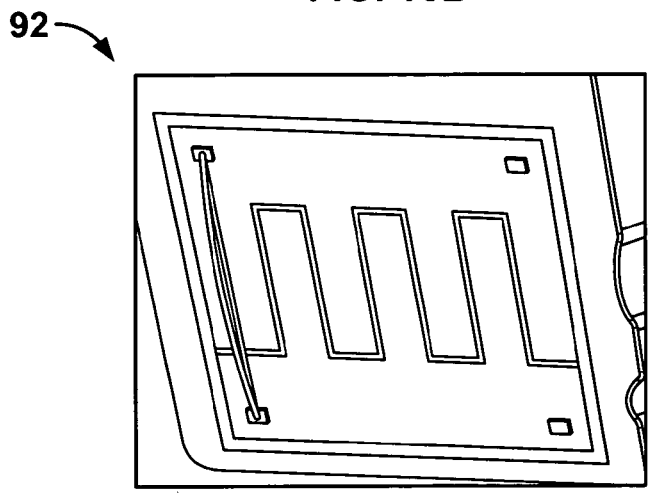
FIG. 16C is a perspective view of the interdigitated dual photodiode transceivers of FIG. 16A.

Referring now to FIG. 16A-16C, a another version of a self-powered, semiconductor-based active transceiver is depicted. The series array of off-the-shelf photodiodes 82a-82e of the transceiver 74 of FIGS. 11-13 has been replaced by an interdigitated array of two photodiodes 88, 90. This interdigiated array can allow for balanced illumination of the two photodiodes 88, 90, resulting in a highly efficient coupling with an incident beam of small cross-sectional area. The transceiver (receiver) 92 is fabricated using GaAs PIN structure wafer with an insulating substrate. Standard semiconductor processing techniques of photolithography, etching and deposition were used to fabricate the transmitter 92 in the laboratory. The transceiver 92 is connected to a VCSEL 94 (i.e., the transmitter) as a transmitter.

Figure 17A:
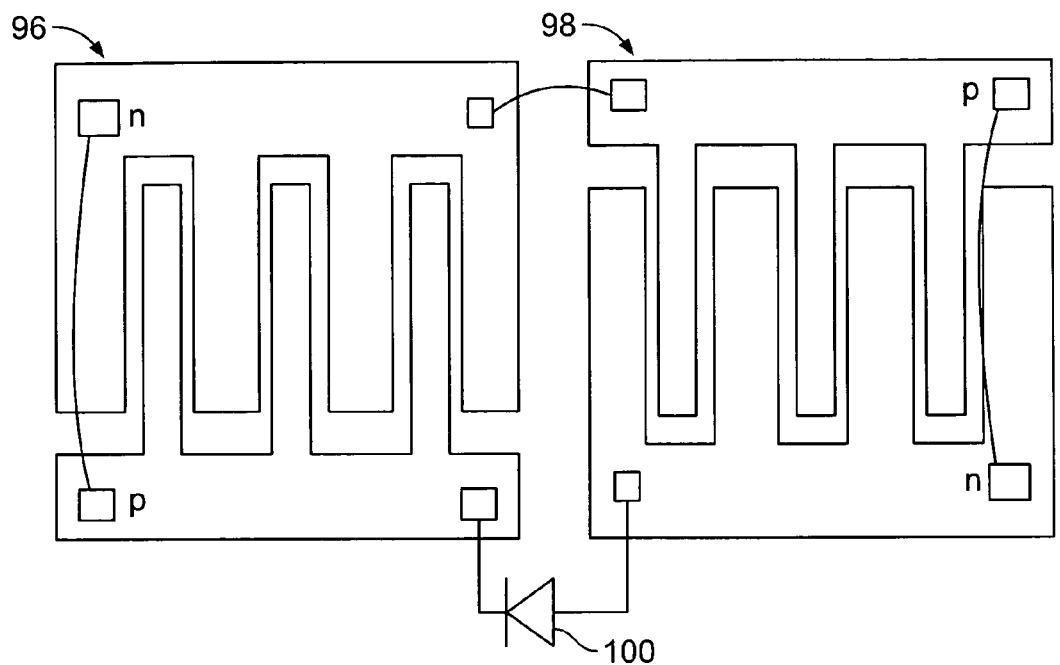
FIG. 17A is a block diagram showing another implementation of the interdigitated dual photodiode transceivers shown in FIGS. 16A and 16C.
Figure 17B:
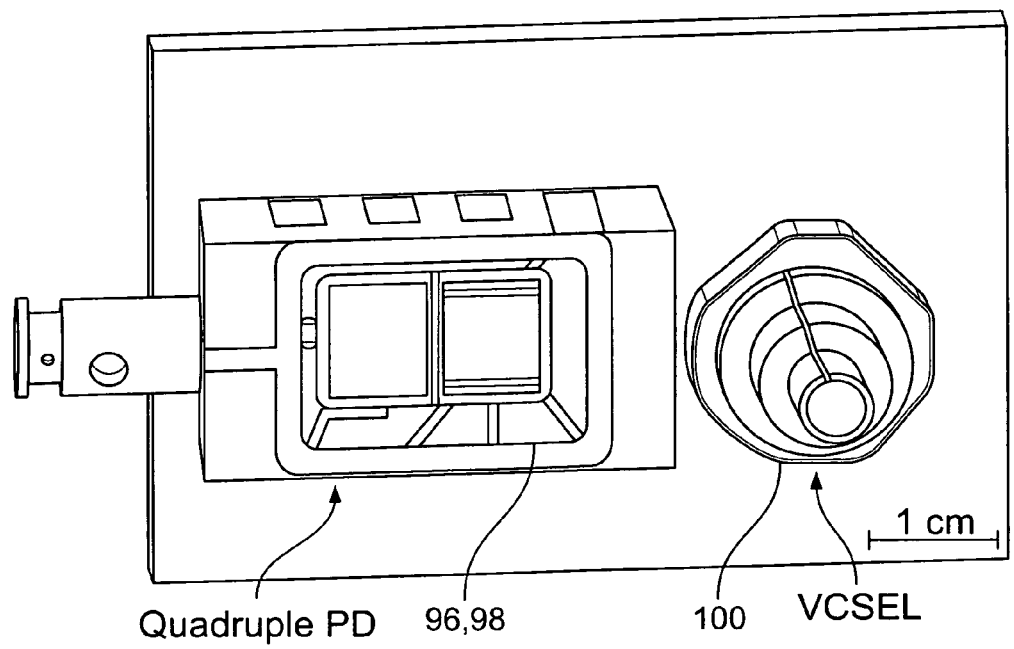
FIG. 17B is a perspective view showing the components of FIG. 17A.

Referring now to FIG. 17A-17B, another version of a self-powered, semiconductor-based active transceiver is depicted. To increase output voltage, a second interdigitated, dual photodiode 96 was connected in series with a first interdigitated, dual photodiode 98 to form a quadruple photodiode (PD). The resulting device was able to drive a VCSEL 100 at an efficiency of 0.001%.

Figure 18:
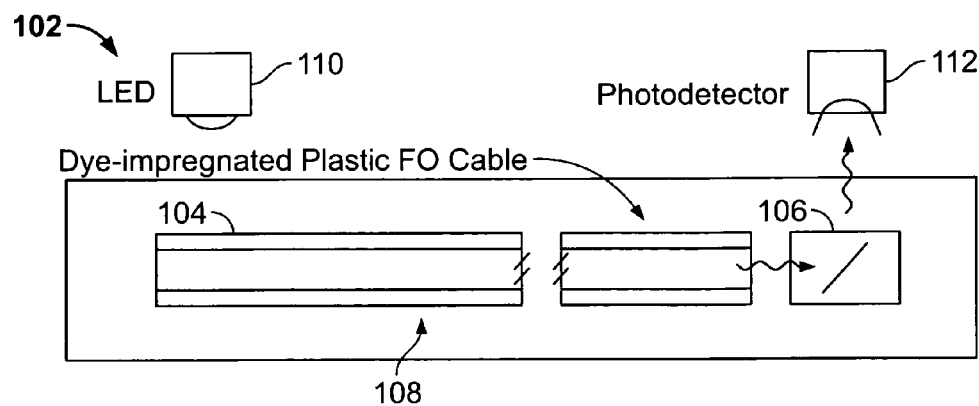
FIG. 18 is a block diagram showing a free-space optical porting composite structure of the present invention which employs a self-powered, dye-based active transceiver with an optical bus.

Referring now to FIG. 18, a still another embodiment of the present invention is depicted which employs a self-powered, dye-based active transceiver utilizing fluorescing dyes with an optical fiber bus. The composite structure 102 includes a dye-impregnated optical fiber 104, a passive optical transmitter 106 (e.g. a mirror), and an encasing composite shell 108. The dye-based impregnated optical fiber 104 is directly stimulated by incoming optical signals (e.g., from an LED 110). New photons, generated by the dye, travel along the optical fiber 104 and are coupled out of the composite structure 102 into a detecting device (e.g., a photodetector 112). Instead of using the mirror 106 as an optical transmitter, the optical fiber can be bent up and out of the composite in order to extract the photons. It is also possible to replace a dyed optical fiber with a conventional, dye-less optical fiber bus coupled to dye-based transceiver optics at the ends of the optical fiber bus.

The impregnated fiber can be illuminated at an end face or on the side. When the fiber is illuminated from the side only newly created photons are carried along the fiber. In the present invention, side illuminated is preferred.

Figure 19:
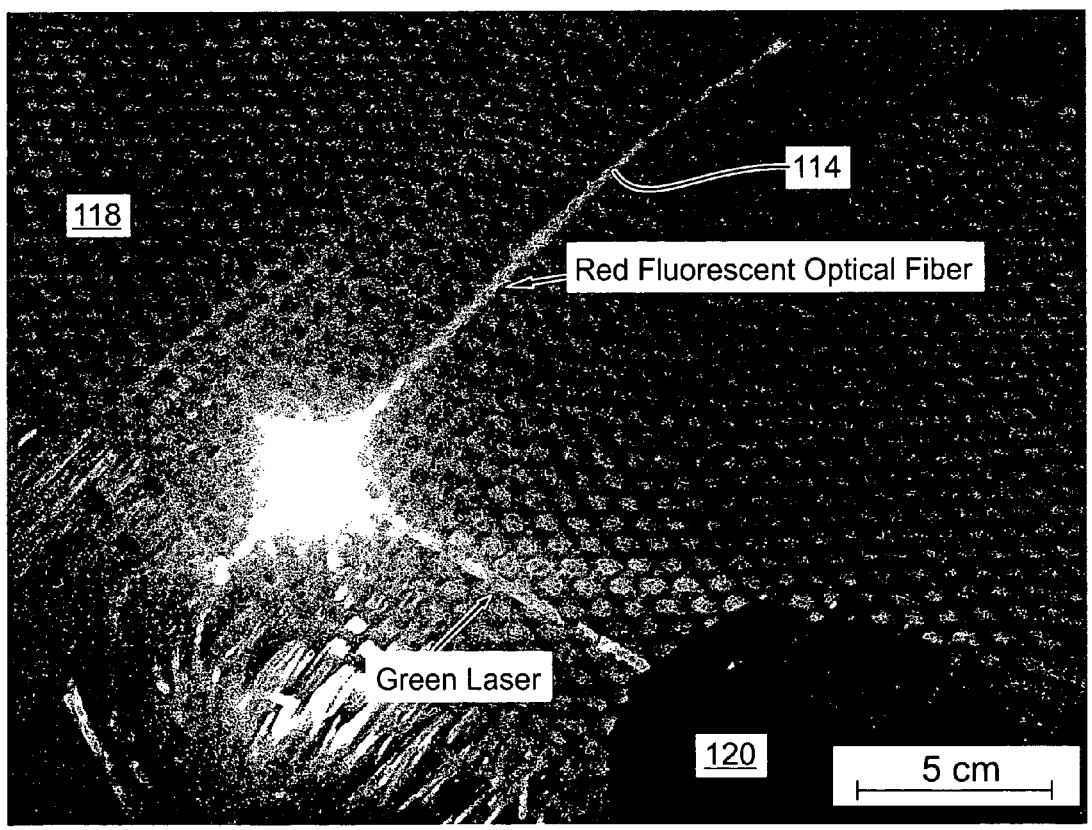
FIG. 19 is a photograph of the dye-based active transceiver of FIG. 18, utilizing a fluorescing optical fiber.

With reference to FIG. 19, a 1.0 mm diameter dye-impregnated plastic optical fiber 114 from Industrial Fiber Optics, with a peak emission of 635 nm (red) was manually woven into a conventional, plain-woven glass fabric 118. A 532 nm green laser 120, oriented normal to the fiber length, was then used to illuminate the dye fiber 114. The green laser source 120 causes the dye to fluoresce and produce red photons, which are waveguided along the fiber 114 and exit at its cleaved end. The efficiency of this technique was measured and determined to be approximately 0.1% free space to free space light, which is sufficient for optical communication. Measurements also indicate that signal transmission of at least 100 kHz is possible.

Figure 20:
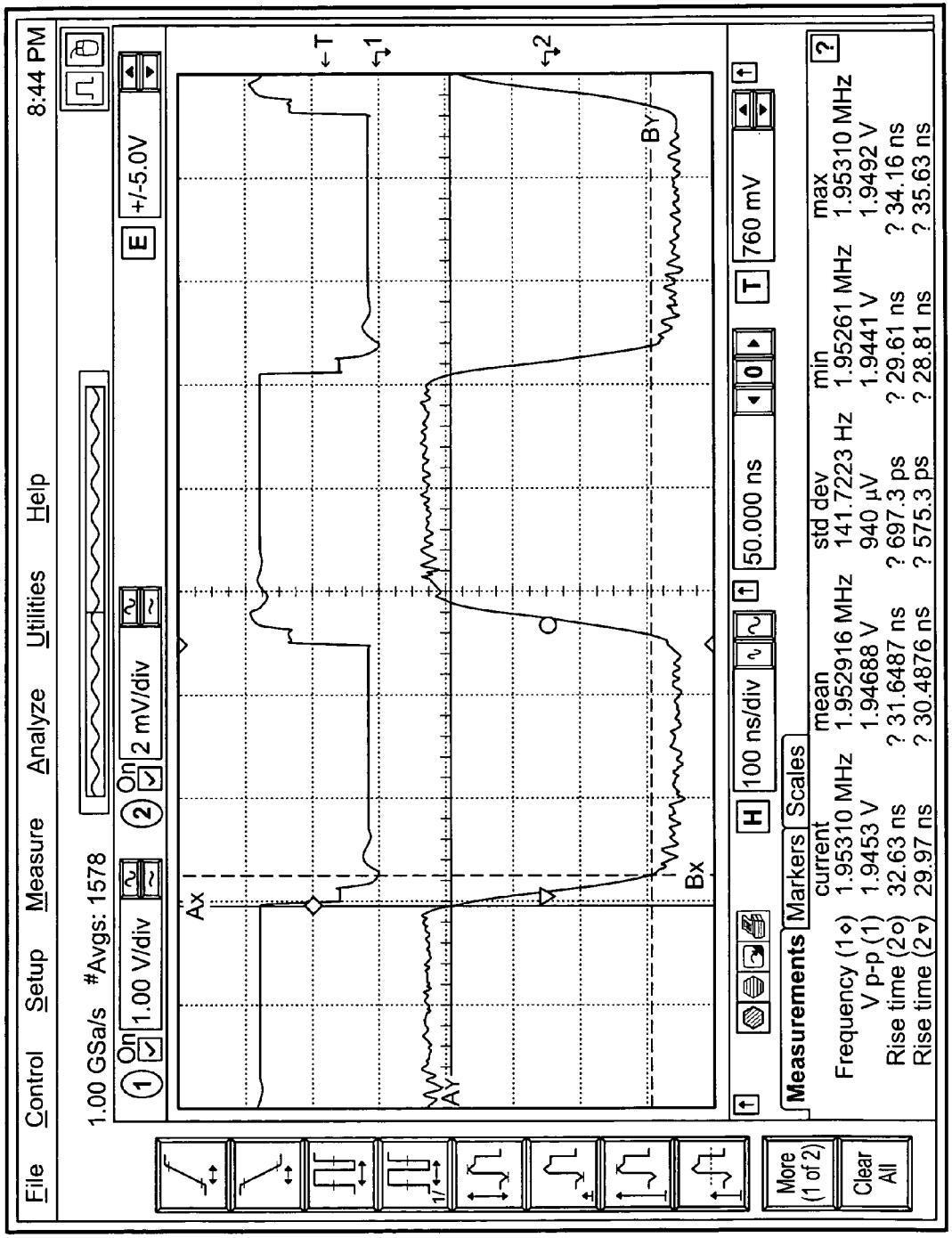
FIG. 20 is an oscilloscope trace showing an input square wave signal and the result output signal generated by the composite structure of the present invention which employs a self-powered, dye-based active transceivers with an optical bus.

FIG. 20 is an oscilloscope trace showing data transmission through the composite structure 102 of FIGS. 18-19. The upper trace 1 is the input signal, while the lower trace 2 is the output signal. The output signal on trace 2 shows an attenuation factor of 100 and the output waveform is NOT inverted relative to the input waveform for convenience of display (a non-inverting output waveform could also have been displayed). Note that the measurements indicated in the oscilloscope trace indicate data transmission rates of greater than 15 MHz.

It should be appreciated that the present invention provides numerous advantages over the conventional wired or wireless LANs optical. For instance, because the composite structures of the present invention are connectorless, optical fibers and optical devices can be completely embedded within a composite, creating a simple and robust integrated data bus. Furthermore, through the use of multiple and redundant busses and transceivers, a modular structural network can be created which can be quickly and simply reconfigured. The self-powered composite structures of FIGS. 11 and 18 show that it is possible to couple with embedded busses without requiring independent power busses to drive the embedded components.

The composite structures illustrated in FIGS. 1, 2, 3, 11, and 18 have several advantages over the prior art. For example, the composite structures of FIGS. 1-3 are more robust to environmental and mechanical stresses. The photodiode-based composite structure 72 of FIG. 11 demonstrates efficient use of semiconductor devices, while the dye-based composite structure 102 of FIG. 18 shows a remarkably simple and elegant free-space coupling approach. The response of embedded optical fibers with impregnated fluorescent dye has been measured to be microseconds or less, thus supporting data rates of at least few megabits per second. With the wireless optical implementation, sensing and communication to embedded optical and electrical networks is enabled with minimum physical invasiveness.

The composite structures of FIGS. 1, 2, 3, 11, and 18 demonstrate that it is possible to completely embed an optical data network inside a structure while still enabling efficient coupling of external optical devices. In addition to transmitting information between external devices, it is possible that this concept could be used to create connectorless, embedded sensors which are interrogated using similar free-space optical techniques. The free-space coupling techniques described above are also applicable to optical porting with embedded electrical networks or sensors.

It will be understood that the embodiments described herein are merely exemplary and that a person skilled in the art may make many variations and modifications without departing from the spirit and scope of the invention. All such variations and modifications are intended to be included within the scope of the present invention as defined in the appended claims.

What is claimed is:

1. An optical composite structure, comprising:
a composite material;
means for receiving a first free space optical signal external to said composite material, said means for receiving embedded in said composite material at a first location and oriented to receive the first free space optical signal at an angle to said composite material, the first free space optical signal transmitted through said composite material;
means for transmitting a second free space optical signal external to said composite material, said means for transmitting embedded in said composite material at a second location and oriented to transmit the second free space optical signal at an angle to said composite material, the second free space optical signal transmitted through said composite material; and
a communication medium embedded in said composite material for allowing communication between said means for receiving the first optical signal and said means for transmitting the second optical signal.

2. The optical composite structure of claim 1, wherein said means for receiving is oriented to receive the first free space optical signal at an angle of about 90 degrees to said composite material.

3. The optical composite structure of claim 1, wherein said means for transmitting is oriented to transmit the second free space optical signal at an angle of about 90 degrees to said composite material.

4. The optical composite structure of claim 1, wherein said composite material includes a foam core impregnated with resin.

5. The optical composite structure of claim 4, wherein said communication medium includes a cable embedded in said composite material.

6. The optical composite structure of claim 5, wherein said cable is a fiber optic cable.

7. The optical composite structure of claim 6, wherein said fiber optic cable is a fluorescent dye-impregnated plastic fiber optic cable.

8. The optical composite structure of claim 7, wherein said fluorescent dye-impregnated plastic fiber optic cable functions as said means for receiving said first free space optical signal and generates a signal representative of the first free space optical signal.

9. The optical composite structure of claim 8, wherein said means for transmitting said second free space optical signal further includes a mirror for receiving said signal representative of said first free space optical signal via said dye-impregnated plastic fiber optic cable.

10. The optical composite structure of claim 6,
wherein said means for receiving the first free space optical signal includes
a first photodetector for receiving the first free space optical signal;
a first optical-to-electrical converter in signal communication with said first photodetector; and
a first LED in signal communication with said first optical-to-electrical converter, said first LED being capable of driving said optical fiber with a signal representative of said first free space optical signal; and
wherein said means for transmitting the second free space optical signal includes
a second photodetector for receiving the signal representative of the first free space optical signal;

a second optical-to-electrical converter in signal communication with said second photodetector; and
a second LED in signal communication with said second optical-to-electrical converter, said second LED generating the second free space optical signal.

11. The optical composite structure of claim 6, wherein said means for receiving the first optical signal and said means for transmitting the second optical signal include first and second self-powered, active transceivers, respectively.

12. The optical composite structure of claim 11, wherein said first self-powered, active transceiver includes
a first plurality of photodiodes connected in series for receiving the first optical signal;
and a first light emitting device connected in parallel with said first plurality of photodiodes for transmitting a signal representative of the first optical signal; and
wherein said second self-powered, active transceiver includes
a second plurality of photodiodes connected in series for receiving the signal representative of said first optical signal; and
a second light emitting device connected in parallel with said second plurality of photodiodes for transmitting the second optical signal.

13. The optical composite structure of claim 12, wherein said first and second light emitting devices are vertical-cavity surface-emitting lasers (VCSEL).

14. The optical composite structure of claim 11, wherein said first self-powered, active transceiver includes
a first receiver including an interdigiated dual photodiode for receiving the first optical signal; and
a first transmitter including a first light emitting device connected in parallel with said interdigiated dual photodiode for transmitting a signal representative of said first optical signal; and
wherein said second self-powered, active transceiver includes a second receiver including a GaAs PIN structure wafer for receiving the signal representative of said first optical signal; and
a second transmitter including a second light emitting device electrically connected to said GaAs PIN structure wafer, said second light emitting device generating the second optical signal.

15. The optical composite structure of claim 14, wherein said first and second light emitting devices are vertical-cavity surface-emitting lasers (VCSEL).

16. The optical composite structure of claim 14, wherein a second interdigiated, dual photodiode is connected in series with said first interdigiated dual photodiode.

17. The optical composite structure of claim 5, wherein said cable is a coaxial cable.

18. The optical composite structure of claim 17, wherein said means for receiving a first optical signal includes a photodetector and an operational amplifier with in electrical communication with said photodetector, said receiver being capable of driving said coaxial cable with a signal representative of said first optical signal.

19. The optical composite structure of claim 18, wherein said means for transmitting said second optical signal includes an operational amplifier and a feedback light emitting diode in electrical communication with said operational amplifier, said transmitter being capable of receiving the signal representative of said first optical signal.

20. An optical composite structure, comprising:
a composite material;
a first mirror for receiving a first free space optical signal external to said composite material, said first mirror embedded in said composite material at a first location and oriented to receive the first free space optical signal at an angle to said composite material, the first free space optical signal transmitted through said composite material;
a second mirror for transmitting a second free space optical signal external to said composite material, said second mirror embedded in said composite material at a second location and oriented to transmit the second free space optical signal at an angle to said composite material, the second free space optical signal transmitted through said composite material; and
a communication medium embedded in said composite material for allowing communication between said first mirror and said a second mirror.

21. The optical composite structure of claim 20, wherein said composite material includes a foam core impregnated with resin.

22. The optical composite structure of claim 21, wherein said communication medium includes a fiber optic cable embedded in said composite material.

23. A method of transmitting an optical signal through an optical composite structure comprising:
receiving a first free space optical signal at a first location of the composite structure at an angle to the composite material, the first free space optical signal transmitted though the composite structure;
transmitting a signal representative of the first free space optical signal over a communication medium embedded in the composite structure to a second location in the composite structure;
receiving the signal representative of the first free space optical signal at the second location; and
transmitting a second free space optical signal through the composite material at the second location at an angle to the composite material.

24. An optical composite structure, comprising:
a composite material including a foam core impregnated with resin;
means for receiving a first optical signal external to said composite material, said means for receiving embedded in said composite material at a first location and oriented to receive the first optical signal at an angle to said composite material, wherein said means for receiving the first optical signal includes a first photodetector for receiving the first optical signal, a first optical-to-electrical converter in signal communication with said first photodetector, and a first LED in signal communication with said first optical-to-electrical converter, said first LED being capable of driving said optical fiber with a signal representative of said first optical signal;
means for transmitting a second optical signal external to said composite material, said means for transmitting embedded in said composite material at a second location and oriented to transmit the second optical signal at an angle to said composite material, wherein said means for transmitting the second optical signal includes a second photodetector for receiving the signal representative of the first optical signal, a second optical-to-electrical converter in signal communication with said second photodetector, and a second LED in signal communication with said second optical-to-electrical converter, said second LED generating the second optical signal; and
a fiber optic cable embedded in said composite material for allowing communication between said means for receiving the first optical signal and said means for transmitting the second optical signal.

25. The optical composite structure of claim 24, wherein said means for receiving embedded in said composite material is oriented to receive the first optical signal at an angle of about 90 degrees to said composite material.

26. The optical composite structure of claim 24, wherein said means for transmitting embedded in said composite material is oriented to transmit the second optical signal at an angle of about 90 degrees to said composite material.

* * * * *

UNITED STATES PATENT AND TRADEMARK OFFICE
Certificate

Patent No. 7,387,451 B2                                                      Patented: June 17, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Keith Goossen, Howell, NJ (US); Shridrar Yarlagadda, Newark, DE (US); Eric Wetzel, Baltimore, MD (US); Daniel O'Brien, Forest Hill, MD (US); and Michael Teitelbaum, Elkton, MD (US).

Signed and Sealed this Fourteenth Day of August 2012.

UYEN-CHAU LE
*Supervisory Patent Examiner*
Art Unit 2874
Technology Center 2800